AUTOMATIC CHANNEL APPARATUS

Original Filed April 6, 1964

INVENTORS
LEWIS E. KING
WILLIAM C. HOSKINSON
EUGENE J. ANNUNZIATA
FRANCIS W. WISE
EDWIN B. PIERCE

BY Owen Lamb
ATTORNEY

Dec. 22, 1970 L. E. KING ET AL 3,550,133

AUTOMATIC CHANNEL APPARATUS

Original Filed April 6, 1964 6 Sheets-Sheet 2

Dec. 22, 1970 L. E. KING ET AL 3,550,133

AUTOMATIC CHANNEL APPARATUS

Original Filed April 6, 1964 6 Sheets-Sheet 4

United States Patent Office 3,550,133

Patented Dec. 22, 1970

3,550,133

AUTOMATIC CHANNEL APPARATUS

Lewis E. King, William C. Hoskinson, Eugene J. Annunziata, and Francis W. Wise, Poughkeepsie, and Edwin B. Pierce, Wappingers Falls, N.Y., assignors to International Business Machines Corporation, New York, N.Y., a corporation of New York Original application Apr. 6, 1964, Ser. No. 357,369, now Patent No. 3,488,633, dated Jan. 6, 1970. Divided and this application Jan. 14, 1969, Ser. No. 812,510

Int. Cl. G06f *3/00*

U.S. Cl. 340—172.5 9 Claims

ABSTRACT OF THE DISCLOSURE

An input/output channel apparatus for a data processing system in which logical information is handled as fixed or variable length data. Logical circuitry is provided in the channel to provide for the assembly of bytes into words and to transfer the words to and from a storage in the data processing system. The data processing system may specify variable length fields which start and end on any byte position within a word. Two registers define a memory area: an address register (specifies the word location) and a mark register (specifies the byte location within a word).

This is a division of application Ser. No. 357,369, now Patent No. 3,488,633 filed Apr. 6, 1964, which is incorporated herein by reference.

This invention relates to electronic apparatus. More particularly, this invention relates to apparatus for permitting portions of an electronic data processing system to communicate with each other.

A data processing system includes a central processing unit, a memory, external input/output devices and one or more channel apparatuses for controlling communication between the external devices and the central processing unit and memory. The central processing unit usually includes arithmetic and logic devices and controls for performing operations upon data with the arithmetic and logic devices. The memory, which has its own controls, typically stores accessible data utilized by the central processing unit and also stores instructions for controlling the utilization of this data by the central processing unit and by the external devices. Though the external input/output devices may operate more slowly than the central processing unit and memory, they provide larger amounts of extra space for storing data and instructions. Each channel apparatus is the main control apparatus for overseeing communication between its connected external input/output devices and the rest of the data processing system. A representative data processing system is disclosed in U.S. Patent No. 3,036,773, "Indirect Addressing in an Electronic Data Processing Machine" of J. L. Brown et al., assigned to the International Business Machines Corporation, which patent is incorporated herein by this reference.

The central processing unit of a data processing system includes an arithmetic circuit for performing operations upon data comprising "bits" (binary integers) represented by signals manifesting either a 0-bit or a 1-bit value. For example, the presence of a positive signal represents a 1-bit, while the absence of a positive signal represents a 0-bit. Additional meaning is given to bits by grouping them into binary-coded sets and subsets. For example, one flexible scheme groups 64 bits into a "word" made up of eight 8-bit "bytes." Within each byte, the bits have values in the order: 128, 64, 32, 16, 8, 4, 2 and 1. The decimal meaning of a byte (such as 129 for 10000001) is obtained by adding together the values for each position having a 1-bit. By extending this "weighting" technique to 64 positions, a very large number may be represented by each data word. Alternatively each one of the eight 8-bit bytes in a word can represent either two decimal numbers, or mixed numbers and characters.

In the embodiment to be disclosed herein, each data word has 64 bits grouped into eight 8-bit bytes including a parity bit (*p*) weighted as follows: *p*, 128, 64, 32, 16, 8, 4, 2 and 1 (binary mode); *p*, 8, 4, 2, 1, 8, 4, 2 and 1 (binary-coded decimal packed numeric mode); and an alphabetic-numeric mode.

The central processing unit also includes controls for overseeing the operation of its arithmetic and logic circuits as well as other operations in which the central processing unit becomes involved. The controls are operated in response to instruction words received from memory and interpreted in the central processing unit.

The memory stores data words, instruction words, and channel command words (or "control words") and status words for the channel apparatus. Typically, the memory is a three-dimensional magnetic core matrix holding words in addressable locations from which they may be obtained, and into which they may be placed, by specifying location addresses. In the embodiment to be disclosed herein, entire eight byte words are accessed at once; associated circuitry masks out undesired bytes of the accessed word. The memory makes no distinction among data words, instruction words and channel command words, the central processing unit distinguishing one type of word from another. All instruction words and channel command words, and many of the data words, are obtained from an external input/output device and placed into the memory, prior to their use, in locations carefully planned by a programmer to achieve the desired operations. Any group of instructions (normally in sequential locations) is called a program, there normally being several related program routines planned for substantially simultaneous execution. For example, an external device sequence of instructions and command words may, if automatic channel apparatus is used, be executed at the same time as a sequence of central processing unit arithmetic instructions. While there are many instruction word formats, a typical instruction word comprises: (1) an operation part, specifying an operation to be performed upon data identified by the instruction, (2) an address part, specifying a memory location at which is found a data word, and (3) additional control information.

By external input/output devices are meant well-known magnetic tape units, printers, card readers, card punches, typewriters and telegraph units as well as magnetic drums, magnetic disk storages, extra core storage memories, etc. Though each of these devices communicates with either the central processing unit or the memory, many input/output devices operate much slower than the central processing unit or memory. For example, without a speed changing device, the slow operation of a card reader would interfere with the fast operation of the central processing unit and memory either making the fast central processing unit wait for the slow card reader or forcing the card reader to run too quickly for accuracy.

There are many prior art methods for adapting slow external devices to the operation of a fast electronic data processing system. Some early computers overcome this asynchronism by suspending all arithmetic and logic operations in the central processing unit during each use of an input/output device. Since the central processing unit waited for the relatively slow input/output device, there was a tremendous waste of computing time.

In one novel prior art approach, the programmer regularly interrogated each input/output device for its service needs by properly spacing special interrogation instructions throughout each program. While this approach could efficiently utilize all parts of the data processing system, it placed a very difficult burden on the programmer and was exceedingly wasteful of memory space.

A more advanced prior art solution is a form of channel apparatus (called a "data synchronizer") linking multiple input/output devices with a central processing unit and memory. Such a data synchronizer is disclosed in U.S. patent application Ser. No. 705,447, filed Dec. 6, 1957, entitled "Data Synchronizer," of C. L. Christiansen et al., and assigned to the International Business Machines Corporation, which application is incorporated herein by this reference. In this referenced data synchronizer, input/output devices are kept in essentially simultaneous operation with a central processing unit which, together with the input/output devices, shares a single memory. Since only one memory accessing operation at a time is possible, priority circuits determine which external device receives priority, and whether the central processing unit, or the external devices as a group, receives priority. When apparatus needing service has priority, it is given sole access to the memory for a limited period of time. If the central processing unit is given access to memory it will either transfer a data word to or from memory or it will receive an instruction from memory. If an input/output device is given priority, it will either transfer a data word between itself and memory, or a channel command word will be transferred from memory to the data synchronizer to control subsequent transfers between input/output devices and the memory.

Still referring to the referenced prior art data synchronizer, the channel command words permit the transfer of large blocks of data between specified input/output devices and predetermined memory areas, without interference either among the input/output devices or between the input/output devices and the central processing unit. Each input/output device is provided with apparatus in the data synchronizer which associates the device with one current channel command word from memory specifying: (1) a current location address, of a "block" of locations, in memory available for use by that input/output device, (2) the number (word count) of successive locations in the block following the initial location, (3) the location of another channel command word for use once the specified block is used, and (4) control information. Each time that an input/output device desires service and has priority, it is connected to the memory for a data word transfer between the currently specified memory location and the input/output device. After each such transfer the current location designation is changed to indicate the next successive location while the word count designation is changed to indicate that one less location is available in the block. When the word count designation indicates that no more locations are available in the memory, a new channel command word may, or may not (depending upon the control information), be obtained.

In the referenced prior art data synchronizer, a word counter, address counter and location counter permit the input/output devices to communicate with block of locations in memory. The address counter indicates the current address at which data is to be stored while the word counter indicates the number of free locations remaining in the memory block assigned. The location counter indicates the next location of another channel command word containing information to be placed into the word counter and into the address counter when the word counter indicates that the end of the current memory block has been reached. This approach requires three separate counters, which are very difficult to check for errors and which are inefficient because each counter sits idle for long periods of time.

Also in the prior art, the memory is addressed by specifying locations at which will be found complete data words. In modern memories using sophisticated masking circuits, it is possible to specify addresses which do not necessarily indicate the beginning of a data word, but rather select the beginning of any 8-bit byte in any data word. Thus, the address, word and location counters are inadequate for byte addressing because they specify the addresses of full word locations only.

Further, in the referenced prior art data synchronizer, if the input/output device is a magnetic tape unit, the 6-bit characters read from the tape must be assembled into 36-bit binary words used by the particular data processing system associated with the referenced data synchronizer. As disclosed in the Christiansen et al. application, an extra counter indicates whenever six 6-bit tape characters (a full data word) have entered the data synchronizer. This counter always starts at the first character position in each word and ends at the sixth position after which is recycles, and is thus inadequate for addressing blocks of bytes (equivalent to characters) if the first (or last) byte in the block is not the first (or last) byte in a word. Also the prior art word counter will not adequately indicate the end of a block if the last byte in the block is not the last byte of the last word in the block.

Prior art counters which are designed to always start at the first byte position of a word, cannot be used if, due to sophisticated memory masking apparatus, it is possible to start with any position, and not necessarily the first position.

Due to the prior art emphasis on addressing complete words, there is no provision for indicating to the central processing unit and memory which portions of a byte-addressable data word are utilized by an input/output device. Failure to provide such an indication, where any byte in any word can be separately specified, can cause unintentional interference between bytes.

In the prior art, it was difficult to connect a wide variety of input/output devices to a single channel apparatus. Since it has been common to provide different numbers of connections for different types of input/output devices, a large number of different contacts are necessary on a single channel in order to accommodate the great variety of input/output devices that may be connected to that channel.

In the prior art, a single memory is shared by a central processing unit and a multiplicity of input/output devices connected to a data synchronizer. Since the circuit configurations assume that a particular memory is connected, the use of any memory in place of, or in addition to, the memory for which the synchronizer was designed is difficult.

It is therefore an object of this invention to provide improved synchronization apparatus for permitting intercommunication of input/output devices and memory locations.

Another object of this invention is to provide simple efficient circuitry for defining memory location blocks available to input/output devices.

Still another object of this invention is to efficiently provide multiple functions for single circuits used in allotting memory locations for communication of data with input/output devices.

It is an object of this invention to associate bit-groups communicated to and from input/output devices with the proper corresponding bit-group positions within multiple-bit words.

Another object of this invention is to provide apparatus for properly associating a byte communicated to or from an input/output device with the proper byte location in a memory.

A further object of this invention is to provide apparatus for permitting an input/output device to begin communicating with a word location in memory at a point other than the beginning of the word.

It is an object of this invention to provide means for indicating the end of an assigned area of locations in a memory.

Another object of this invention is to provide apparatus for controlling the end of communication of data words between input/output devices and a memory.

A still further object of this invention is to provide simple apparatus for recognizing when the end of a block of data in a memory has been reached.

It is also an object of this invention to provide a novel byte counter circuit.

A further object of this invention is to provide apparatus for permitting communication between input/output devices and a memory under control of a novel byte counter which perfoms multiple independent functions.

It is an object of this invention to provide apparatus for indicating which bit group of a multi-bit word is filled in accordance with a bit group position control device.

A further object of this invention is to provide apparatus for indicating the utilization, or non-utilization, of byte sections of a data word.

A still further object of this invention is to provide apparatus for indicating that byte portions of a word have been entered into corresponding positions of a register holding a plurality of bytes.

Another object is to provide apparatus for connecting different types of memories to the same channel apparatus.

A further object is to provide apparatus for connecting a plurality of different memory types to each channel apparatus.

The foregoing and other objects, features and advantages of the invention will be apparent from the following more particular description of the preferred embodiment of the invention, as illustrated in the accompanying drawings.

These objects are achieved by improved channel apparatus including a count register, data address register, byte counter, command address register, A and B (assembly/distribution) registers and adder, and the necessary interconnections and controls.

The byte counter specifies the byte number (from zero to seven) within a particular data word in memory (specified by the data address register) to which the current byte is to be sent from an input/output device. The byte counter controls the assembly of bytes in the A and B registers, sections of which registers correspond to the byte counter contents. Thus, if each register is divided into eight 8-bit sections, the byte counter will control entry into the register section corresponding to the byte counter setting. The byte counter is stepped after each byte transfer, while the register is sent as a a full data word to memory whenever its eighth byte section is filled. One of the A and B registers may communicate a full word to memory while the other register is concurrently assembling the next word. The same circuits may be used for distribution of bytes from the A and B registers to an input/output device.

The end of a block of locations in memory communicating with an input/output device is indicated, though the block may bend (byte counter equals seven) or start (byte counter equals zero) at other than the beginning of a word. The contents of the byte counter are initially added to the contents of the count register (which keeps track of the number of locations remaining in the block). The count register is then decremented by eight (one data word) for each transfer of data between the A and B registers and the memory; while the byte counter is incremented by one for each transfer of a byte between the input/output device and the A and B registers. During handling of the last word in the block, the end of the assigned memory block is reached when the value in the byte counter equals the value in the count register.

The dual function byte counter, which controls the A and B registers and also indicates the end of a block of data words, is necessarily specially designed to achieve its efficient operation. A set of latches at the output of the byte counter provides a look-ahead feature to eliminate the carry ripple time normally associated with counters. This look-ahead feature also permits determination of a count one higher than that which is in the counter itself. Once the counter has been stepped, there is no delay between the time of the stepping and the time that the incremented contents can be used since the output latches can be sensed immediately. The byte counter achieves bi-directional counting as a result of circuits which sense its true and the complement outputs. Thus by stepping the byte counter in one direction it is possible to eliminate stepping in the opposite direction by utilizing only its complement output.

A "mark register" keeps track of filled register sections and coordinate memory accessing with the A and B registers contents. After each byte transfer into, or from, the A and B registers, the byte counter sets the one bit, of eight bits, in the mark register which corresponds to the A and B registers byte section utilized.

GENERAL

Figure 1:
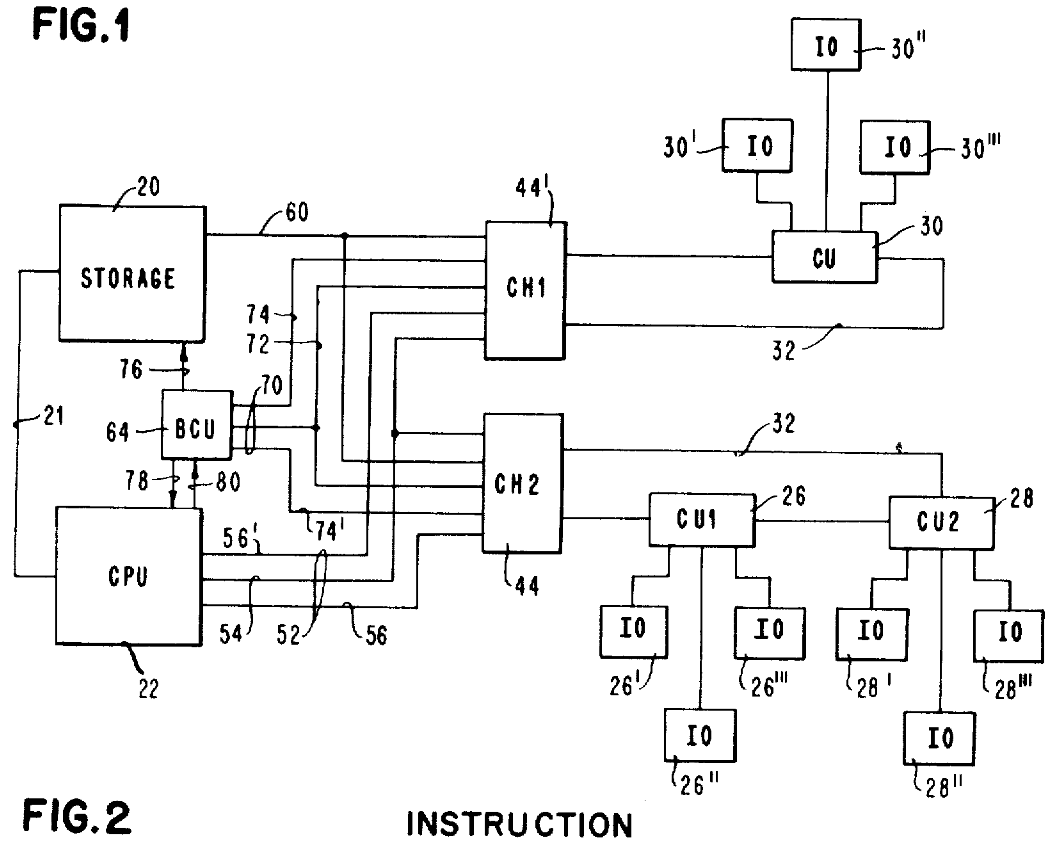
FIG. 1 is an electrical schematic of the present invention.

Referring to FIG. 1, an information processing system of the form contemplated by the present invention includes a main storage unit 20 of the type described in a copending application, Ser. No. 375,683, filed Apr. 6, 1964, assigned to the same assignee as that of the present invention. The storage is connected through a suitable bus 21 to a central processing unit CPU 22 of the type described in an application, Ser. No. 357,372, filed Apr. 6, 1964, now U.S. Pat. 3,400,371, G. M. Amdahl et al., assigned to the same assignee as that of the present invention. A plurality of control units 26, 28 and 30 individually governs a plurality of connected input/output devices 26', 26'' . . . 26'''; 28', 28'' . . . 28''' and 30' . . . 30'''. A typical control unit and governed input/output devices are described in a copending application, Ser. No. 357,370, filed Apr. 6, 1964, assigned to the same assignee as that of the present invention. The control units are connected through an I/O interface bus 32 of 28 lines to be described hereinafter. The bus 32 also include a priority selection bus (not shown) since all control units time share the bus 32.

Each I/O interface bus connects to a data channel 44. Each data channel 44 is connected to the CPU through a CPU interface 52 including a multiplex bus 54 and a plurality of simplex or single direction line 56, 56' both of which will be described hereinafter. All data channel units share the multiplex bus 54. The same number of simplex lines are connected between each channel unit and the CPU.

Each channel unit is connected to the storage unit 20 by way of a storage interface 60 which is operated as a multiplexed bus by a bus control unit 64, described, for example, in IBM Customer Engineering Instruction—Reference—7090 Data Processing System, published 1961 by International Business Machines Corporation, pp. 38 through 44. A bus control interface 70 comprising a multiplex 72 and individual simplex lines 74 interconnects the channel units and bus control unit 70. Completing the bus control unit is storage bus in 76 and a CPU bus in 78 and bus out 80.

INSTRUCTION, COMMAND AND CONTROL ORDER FORMATS

The following describes the format of binary code combinations which serve as instructions, commands and control orders to initiate the operation of the channel in directing the flow of information between I/O devices and main storage. An instruction is prepared by the CPU and, after decoding, executed by the channel. The instruction may be a start I/O, halt I/O, test I/O, or a test channel. Commands are fetched from memory by the channel when a start I/O instruction is received. Commands, after decoding, iniate I/O operation. The channel is capable of executing write, read, read backwards, control, sense and transfer in channel commands. A control command indicates an operation at an I/O device that does not involve transmission of data, e.g., backspacing or rewinding magnetic tape.

Figure 2:
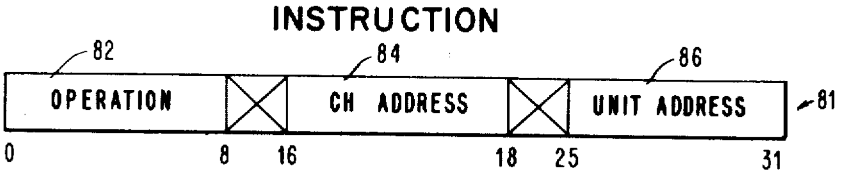
FIG. 2 is an instruction format for use in the present invention.

Referring to FIG. 2, an instruction format 81 is indicated as comprising 32 binary bit positions. The instruction format comprises an operation code field 82, a channel address field 84 and a device or unit address field 86 The operational code is eight binary bits and may describe a START I/O, TEST I/O, HALT I/O and TEST CHANNEL operation. Eight through fifteen and eighteen through twenty-five of the instructions are ignored. The channel address field comprises three binary bits and the device address comprises eight binary bits. The particulars of a START I/O operation, that is, whether it is a write, read, read backward, control or sense operation, are determined by the CPU program stationing in a prefixed storage address the location of the command desired to be executed.

A HALT I/O instruction does not require an eight bit unit address. When HALT I/O instruction is issued to a working channel, the channel is disconnected from the I/O device. The HALT I/O instruction will cause no action when issued to a non-working channel or to one that has finished an operation and is waiting to interrupt.

The TEST I/O instruction is used to clear interruption conditions that exist in an addressed channel or an associated I/O device. The instruction will cause a channel status word (CSW) to be placed in a designated storage location and the interruption condition to be cleared. The CSW includes a channel and device status bits which identify the error condition.

A test channel instruction does not require an eight bit unit address. The instruction causes the channel to send a condition code describing the channel's present state at which time the CPU is released.

Figure 3:
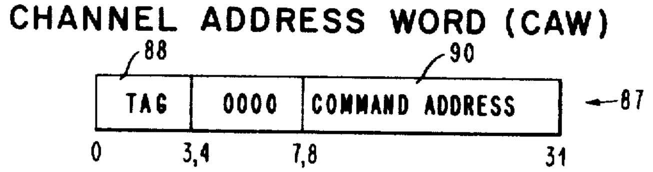
FIG. 3 is a format for a channel address word.

A START I/O operation directs the channel to enter storage at a designated location and obtain a channel address word (CAW), the format of which is in FIG. 3.

Essentially, the CAW 87 is an indirect address providing the location of the desired command. The CAW, as indicated in FIG. 3, has 32 binary bit positions including a tag field 88 and a command field 90. The tag field 88 has three bits which describe the memory area in which the I/O operation, i.e., read, write, read backward, etc., will be performed. The command address field 90 specifies the location of a command control word (CCW) which describes the particular I/O operation to be performed. The bit positions 4 through 7 must be binary zeros for CAW validity purposes.

Figure 4:
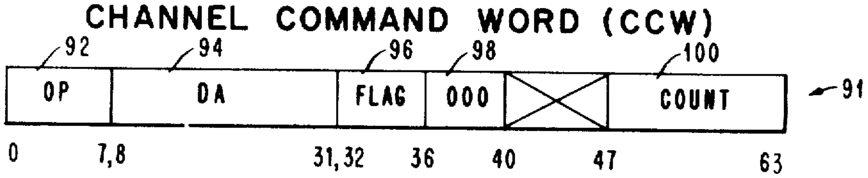
FIG. 4 is a format for a channel command word.

Referring to FIG. 4, a channel command word (CCW) 91 format of 64 bit positions plus 8 parity bits (not shown) includes an operation code field 92 of eight bits; a data address field 94 of 24 bits; a flag field 96 of six bits; a buffer field 98 of five bits, and a count field 100 of 24 bits. The bit positions 40 through 47 are ignored. The command field 92 specifies the operation, i.e., read, write, etc., to be performed. The data address field 94 specifies an eight byte storage location in the main storage where the data is to be stored or read. The count 100 specifies the number of data bytes to be processed. Bit positions 37–39 indicate the validity of the CCW. The flag field 96 comprises a chain data address flag bit, a chain command flag bit, a suppress incorrect length indication flag bit, a skip flag bit, and a program control interruption flag bit, all of which will be descrbed hereinafter.

A write command, appearing in the operation field 92, initiates the execution of a write operation at the I/O device. The command causes data to be transferred from main storage to the I/O device. Data in the storage are fetched in ascending order of addresses starting with the data address specified in the CCW. A CCW used in the write operation is inspected for various flags which indicate error and other conditions encountered in the operation. The write operation may be modified through the appearance of selected bits in the operation field.

A read command initiates the execution of a read operation at the I/O device. The command causes data to be transfered from the I/O device to the main storage. Data are placed in the main storage in ascending order of addresses starting with the address specified in the CCW. All flag bits are inspected during a read operation. The read operation may also be modified by the appearance of selected bits in the operation field.

A read backward command initiates the execution of a read backward operation at the I/O device. This command is applicable to only certain magnetic tape devices, and causes a read operation to be performed with the tape moving backward. The bytes of data within a record are sent to the channel in a sequence that is reverse with respect to that on writing. The data are placed in storage in descending order of addresses starting with the address specified in the CCW. All flags in the CCW are inspected during a read backward operation. Modifier bits may be placed in the operation field to alter the operation.

A control command is used to initiate an operation at the I/O device. The command is fetched from storage and decoded by the I/O device. Back spacing, rewinding magnetic tape or positioning a disk access mechanism are performed by the I/O device. The command specifies the entire control function. The data address designates such additional information as is required for the operation.

Chain command (CC) flag which appears in bit position 33 gives the programmer the option of initiating multiple I/O operations with a single CPU START I/O instruction. When the count of a particular CCW is exhausted and the CC flag is on, the channel will fetch the next sequential command address. This command address will specify a transfer in channel or a new I/O operation to be performed. Command chaining makes it possible for a programmer to initiate the transmission of multiple blocks of data with a single START I/O instruction. It also permits a single instruction to specify certain auxiliary functions such as rewinding tape at the end of a data transmission. Command chaining, in conjunction with status modifier bits, permits the channel to modify the normal sequence of operation in response to signal provided by the I/O device. Since command chaining always involves an initiation of new I/O operations, there are no restrictions on its use.

The suppress incorrect length indication flag (SILI), which appears in bit position 34, controls whether or not an incorrect length condition is indicated to the program. An incorrect length condition exists where the count field of the CCW and the record length do not correspond. When this flag bit is present and the CDA flag is off, the incorrect length indication is suppressed. If the CCW has the CC flag on, command chaining will take place. Absence of the SILI flag or the presence of both the SILI and the CDA flags terminates the operation and causes the program to be interrupted.

The chaining data address flags which appear in bit position 32 specify the action that is to be taken by the channel upon the exhaustion of a CCW or the appearance of various error conditions. When the CCW is exhausted either from a count standpoint or from a command standpoint, a new CCW is acquired without the CPU being required to continue the operation at the next address or beginning a new command. The chain data address (CDA) flag permits different parts of the same record to be stored or fetched from non-contiguous areas in the memory. The channel simply interprets the CDA flag as a signal for it to fetch a new count and chain data address flag. The operation code field in the newly fetched CCW is ignored.

The skip flag which appears in bit position 35 permits the suppression of main storage references during an I/O operation. The skip flag is applicable to read, read backward and sense operation. In all other instances the skip flag is ignored. Skipping affects only the handling of information by the channel. The operation at the I/O device proceeds normally and information is transmitted to the channel. The channel, however, keeps updated the count but does not place the information in the main storage. The skipping feature, when combined with CDA chaining, permits the program to place in main storage selective portions of a record in an I/O device.

The program control interruption flag which appears in bit position 36 permits the programmer to cause an I/O interruption during execution of an I/O operation. Whenever the PCI flag and CCW are on, the channel will attempt to interrupt the program as soon after start of the transmission as possible. The setting of the PCI flag is inspected in every CCW except those specifying a transfer in channel. Modifier bits may be included in the operation field.

The sense command initiates the execution of a sense operation at the I/O device. This command causes sense status information to be transferred from the I/O device to main storage. The information is placed in the storage in ascending order of addresses starting with the address specified in the CCW. The sense status provides more detailed information than that provided in the CSW. The sense command thus provides detailed information concerning the status of the I/O device. Flags are inspected and modifier bits may be included.

The transfer in channel command causes the channel to fetch the next CCW from the location specified in the data address field of the transfer and channel command. Thereafter, the data address is then incremented and placed in a command address register. The command initiates no operation at channel or at the I/O device. The purpose of the transfer in channel command is to provide chaining between non-adjacent CCW's. The transfer in channel can occur both in data address and command chaining. Some flags and modifier bits are not recognized.

CHANNEL UNITS

Figure 5A:
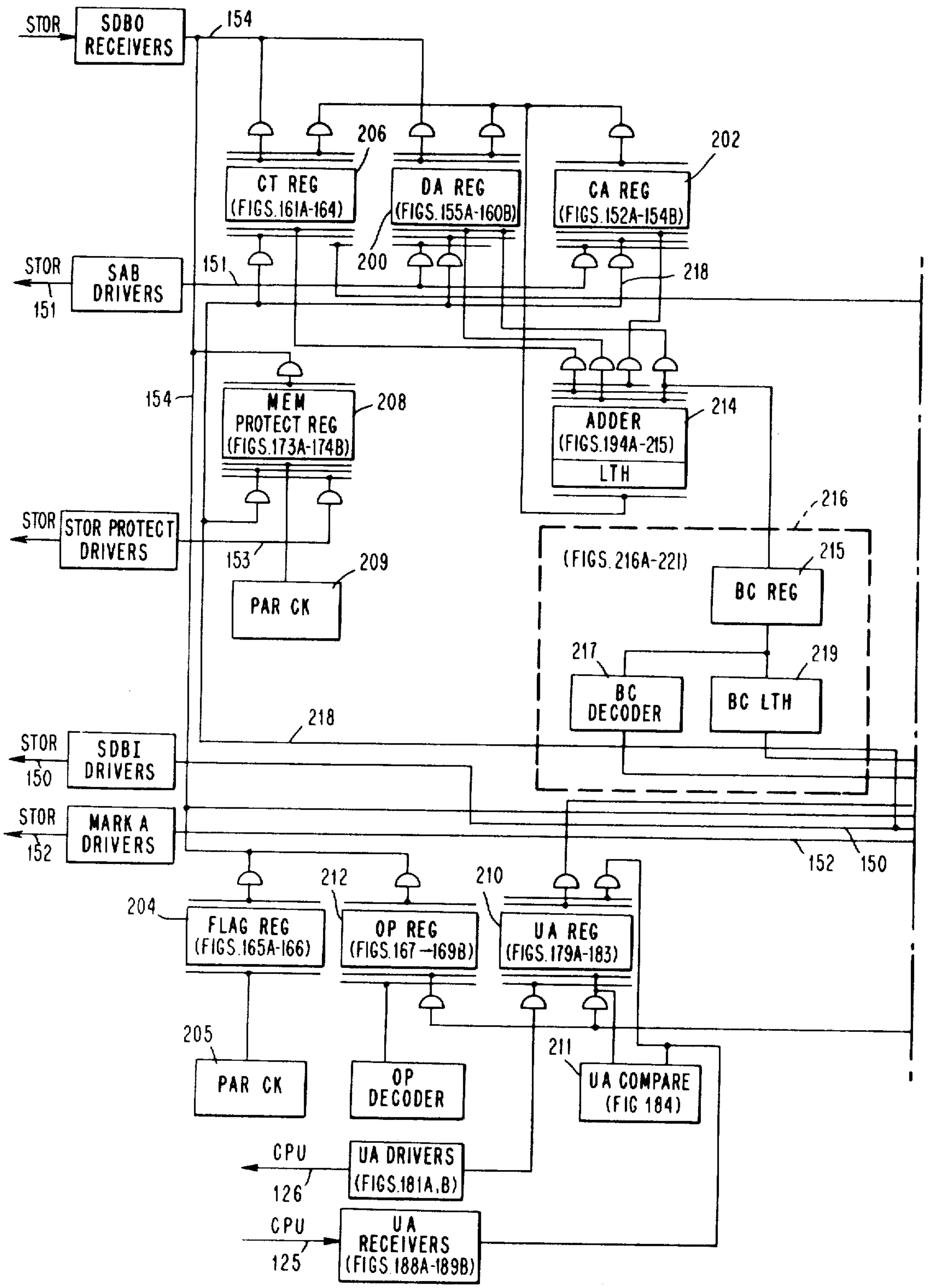
FIGS. 5A and 5B are an electrical schematic of data flow in the present invention.
Figure 5B:
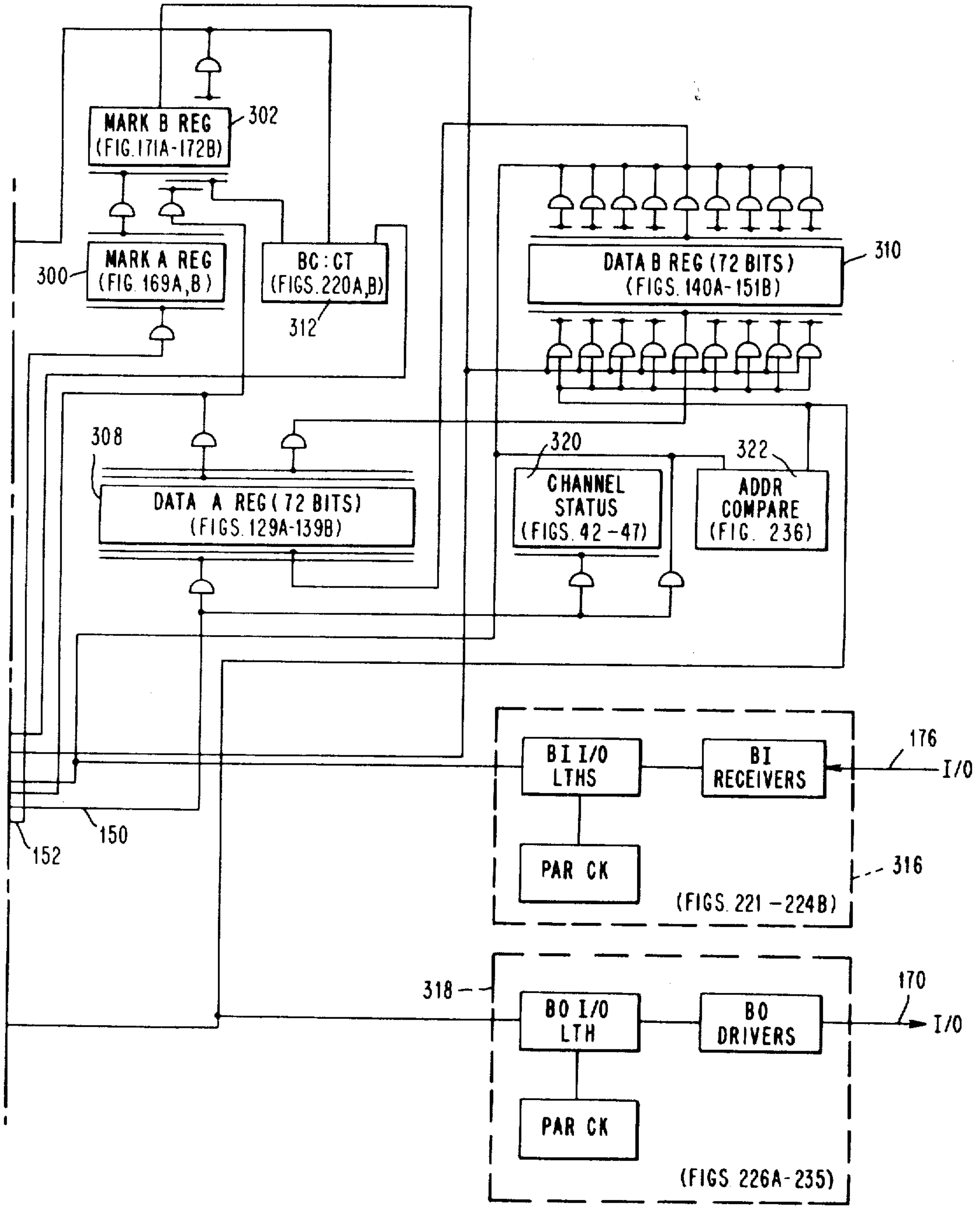

The channel, as shown in FIGS. 5A and 5B comprises programming registers, data transfer registers, controls and clock means. These units respond to an instruction from the CPU to transfer information to or from storage. When an I/O device provides any signal that should be brought to the attention of the CPU program, the channel converts the signal to a format compatible with that used by he CPU. The channel contains all the common facilities for the control of I/O operation. The I/O operations are completely overlapped with the activity in the CPU. Additionally, the channel operations are overlapped with one storage cycle only. The only main storage cycles required during I/O operations are those needed to transfer the data to or from the final locations in main storage. These cycles do not interfere with the CPU program, except when both the CPU and the channel concurrently attempt to refer to the same storage. Each of the various sections of the channel will be considered in the following paragraphs:

PROGRAMMING REGISTERS

Referring to FIG. 5A, a data flow diagram indicates a data address register 200, a command register 202, a flag register 204, a count register 206, a storage protection register 208, a unit address register 210, and an operation register 212. Cooperating with these registers are an adder 214 and a byte counter 216. The registers are connected together through the storage bus in 150 and out 154, storage address bus in 151. The horizontal lines across the top of a register indicate the number of bit positions receiving a particular input. The horizontal lines across the bottom of a register indicates the number of bit positions providing a particular output. The partial circles in the data paths indicate gating means. The figure numbers in a block refer to the specification of the above-identified parent application Ser. No. 357,369 now Pat. No. 3,488,633 wherein the details of the unit may be found.

Referring to FIG. 5A, the data address register 200 is a 24 position register. Additional positions are included for parity checking. Each storage position is a latch circuit. Data entry for the register is from two sources. Each bit position is wired to a preselected line of the storage bus in 150 and storage bus out 154. All bit positions except the three low order positions are further wired to a corresponding bit position of the adder 214. The outputs of each bit position are to a corresponding bit position of the adder 214. All bit positions except the three low order positions are further connected to preselected lines of the storage address bus 151. The three low order bit positions of the register are connected as inputs to the byte counter 216 and the corresponding positions of the adder 214.

Basically, the register 200 (21 bits thereof) holds the address where data is to be stored in the storage unit. During a transfer-in-channel command, the register holds the address of the next channel command word, CCW. This same address is updated and sent to register 202 as the next CAW. The register is updated according to a read, write or a read backward operation. The three low order positions indicate the byte position of a word where storage or transfer is to begin.

The command address register 202 is a 21 position register. Each position consists of a latch of the type used in the data register. Three additional positions are included for parity indication. Entry to the command address register is through corresponding bit positions of the adder 214. These inputs are ANDed together with suitable gating, as will appear hereinafter. One output from the command address register is supplied to corresponding adder positions. Another output is supplied to preselected lines of a channel status bus 218 which ultimately connects to the storage data bus in 150. The other output is to storage address bus 151.

The register 202 holds the CAW which provides the location of the desired CCW. While the CCW is fetched, the CAW is updated to provide the location of the next CCW, if desired. The contents of the register become part of the channel status word CSW when an interrupt condition is signaled by the channel.

The count register 206 is a 16 bit register. Each position consists of a latch. Additional positions are included for parity checking. The register also includes a last word trigger output, a count less than two trigger, and a count less than one trigger. Entry to the count register is through preselected lines of the storage data bus output 154 and corresponding bit positions of the adder 214. These inputs are suitably ANDed with gating signals.

The outputs available from the count register 206 appear in true and complement form. The three low order bits are supplied to a byte-count-register comparator 312 and mark B register 302 (see FIG. 5B). All bit positions are supplied to the adder 214 and to the CSW bus 218. Suitable gating circuits operate the count register.

The count register accepts the count field from the CCW supplied from storage. The count field is altered by the adder 214 as data transfer occurs through the channel. Additionally, the count field and low order positions of the byte counter are algebraically related to determine the end of a data transfer operation.

The flag register 204 is a five bit position register. Each position consists of a latch. Entry to the flag register is through selected positions of the storage data bus out 154. These inputs are ANDed together with suitable gating signals. The outputs are supplied to parity checking circuits 205. Other outputs (not shown) are supplied to various control circuits.

The flag register holds the five flags described in the above identified parent application. The flags, for example, indicate whether chaining is to be performed or a channel error condition exists.

The unit address register 210 is an eight bit position register for receiving the address field of the CPU instruction. The address field selects the I/O device to be operated. Entry to each bit position is supplied by the unit address bus out 125 and the data bus in 176. These input signals are suitably gating to develop output signals which are supplied to corresponding bit positions of a unit address compare register 211. The outputs are also supplied to the unit address bus in 126, and to the I/O bus out 170. Outputs (not shown) are also provided for storage data bus in 156 gating circuit.

The register 210 holds the address which is employed to select an I/O device. Alternatively the register holds the address of a device supplying interrupt status. Parity checking circuits are also included in the register.

The unit address compare register 211 is an eight bit position register for comparing the address on the unit address bus out 125 and the I/O bus in 170. Based on this comparison, a unit address signal is supplied to suitable control circuitry for operating the channel.

The storage protection register 208 is a 4 bit position register. Each position consists of a latch. Entry to the register is through preselected positions of the storage data bus out 154. These inputs are ANDed together with suitable gating signals. The outputs from the register are supplied to the storage protect bus 153 and selected bit positions of the channel status bus 218. Additionally, outputs are supplied to a parity checking circuit 209.

The register 208 holds the storage protection tags which locate the area in storage to which data operations will be confined. This data is supplied as part of the CSW when an interrupt or other channel terminating condition occurs.

The operations register 212 is an 8 position register. Additional positions are included for parity checking. Each position consists of a latch circuit. Entry to the operations register is through the storage data bus out 154. These inputs from the ANDed together with suitable gating signals. The outputs from the register are supplied to the data out bus 170 of the I/O interface. Additiontlly, thees outputs are also supplied to storage data bus in gating (not shown). One output (not shown) is supplied to the byte counter 216 to indicate a read backward operation.

The register 212 supplies the command code (or operating the I/O devices 26' (see FIG. 1) in the particular modes, i.e., read, write, sense, and the like. Commands that initiate these operations cause all eight bits to be transmitted to the I/O device. The high order bits contain modifier bits. These bits specify to the I/O device the details of how the command is to be executed. They may cause the I/O device to compare data received during a write operation with data previously recorded and they may specify such conditions as recording density and parity. For the control command, the modifier bits may contain the order code specifying the control function to be performed.

Whenever the channel detects an invalid command, a program checks condition is generated. When the CCW contains an invalid code, the status portion of the CSW is stored during the execution of the start I/O instruction. When the invalid code is detected during command chaining, the new operation is not initiated and an interruption condition is generated. The command code is disregarded during data chaining.

The adder 214 is a 24 position unit including a full adder portion and an increment and decrement portion. The full adder portion involves the four low order bit positions. The remainder of the adder is the increment and decrement portion. All bit positions have a latched output controlled by suitable gating circuitry.

Entry to the low order bit positions is from the data register 200. Additional inputs are supplied from the count register 206 which supplies inputs to all adder bit positions. Bit positions 4 receives a carry signal (not shown) from the increment-decrement portion and the data address signal. Outputs are supplied to a parity checking circuit (not shown), the incrementer-decrementer position (not shown) and the count register 206.

Each bit position of the incrementer-decrementer receives inputs from the command address register 202 and the data address register 200. Additionally, these bit positions except the last byte or high order positions receive an input from the count register 206. Outputs are supplied to the data address register 200, command address register 202, and count register 206. An output is also supplied to a parity error checking circuit (not shown). Incrementing or decrementing is determined by an adder group carry and borrow circuits (not shown).

The adder, increment-decrementer, parity prediction circuits, group carries and borrow circuits cooperate to update the count field and increment or decrement the data address or command address fields. During these processes the command address registers and count register are verified from a parity error standpoint. Any parity error is reported to the appropriate controls for initiating the proper diagnostic routine for the channel. The adder decrements the count by eight and increments the data address by eight.

The byte counter 216 is a three position unit for variable word boundary selection of the data transmitted between the I/O device and storage. The counter includes a register 215, a decoder 217, and a latch 219. Each register bit position comprises three like circuits suitably interconnected. Entry to each bit position is supplied by the three low order outputs of the data address register 200. Suitable gating signals (not shown) are provided in developing output signals supplied to the byte counter decoder 217 and latch circuits 219. Outputs are also supplied to a parity and zero check circuit.

The byte counter decoder 217 receives three inputs from the register 215 and provides like outputs to mark B register 302 and the data B register 310 (see FIG. 58). The decoder selects the appropriate triggers of the mark B register and data B register for operating the storage address bus in supplying the data stored in the A register 308 to storage. The latch 219 receives inputs from the register 215. The outputs are supplied to a byte count-count register comparator 312 shown in FIG. 5B. The byte counter is a binary octal counter with a parity bit for self checking purposes. The latch and decoder sections form a look-ahead feature which eliminates ripple time associated with binary trigger counters. When the byte counter receives a change signal, the register 215 is set to the value in the look-ahead feature. The look-ahead value is arranged to be one number higher than that in the register positions. Once the register has changed, there is no delay required to decode the outputs as the look-ahead feature is latched while the counter is changing. The look-ahead circuitry advances immediately to the next number as soon as the change occurs. The counter may be set to any number by the data address input.

DATA TRANSFER REGISTERS

The data transfer registers transfer data between storage and the I/O devices. Referring to FIG. 5B, the data transfer registers including a mask A register 300, a mark B register 302, an A register 308, a B register 310, a byte counter-count register comparator 312, I/O bus in circuits 316, I/O bus out circuits 318, channel status circuit 320 and an address compare register 322. Each of these registers will be considered in the separate paragraphs hereinafter.

The mark A register 300 is an eight position register that includes an additional position for a parity error check. Each bit position is a conventional latch circuit. Entry to the mark A register is from corresponding bit position of the mark B register. These inputs are ANDed together with suitable gating signals.

The mark A register also receives as gating inputs channel memory controls and other signals. These control signals cooperate with the bit position inputs to provide outputs to the mark bus 152 of the storage. Outputs provided by the various bit positions of the mark A register set the storage triggers for storing data at selected storage locations.

The mark B register 302 is an eight bit position register. Each bit position is a conventional latch circuit. Entry to the mark B register is supplied by the output of the byte counter decoder 217. The count register 206 also supplies its four low order bits to corresponding positions of the mark B register. These signals are ANDed together with suitable write control signals and a gating signal. The register also includes means for parity error checking. All bit positions are supplied to the corresponding bit positions of the mark A register. The three low order bit positions are supplied to the byte count register comparator 312 for word boundary determination. The three low order bits are also supplied to the storage data bus out 154. The mark B register sets the mark A register based upon received inputs.

The A register 308 is a 72 bit register for transferring data or assembling data between the storage 20 and the I/O devices 26, 30 and the like (see FIG. 1). Each bit position is a conventional AND/OR/INVERT cooperating with a conventional inverter to form a latch circuit. Entry to each bit position is from preselected lines of the storage data bus out 154. Also, the corresponding bit positions of the B register 310 are connected to the A register bit positions. These inputs are ANDed together with suitable storage data bus gating signals. As outputs, each bit position is connected to corresponding bit position of the B register and to preselected lines of the storage data bus in 150. A parity bit is generated for each byte and supplied to the B register and the storage data bus in.

The B register 310 is like the A register, a 72 bit register. Each bit position has the same circuit configuration. Entry to each bit position is from the corresponding bit position of the A register. Each bit position is further connected to the I/O bus in 176. These inputs are ANDed together with A register gating signals and I/O gating signals. The I/O gating signals direct the various bytes of incoming data to the various byte positions. The number of bit positions in a group is selected as eight to handle the byte information coming from the I/O device. Each group of bytes includes parity error checking means.

The output from each bit position is supplied to corresponding bit positions of the A register as previously indicated. Outputs are also provided to preselected lines of the I/O data bus out 170. Thus, the B register is adapted to transfer data into storage and out to the I/O devices.

The comparator 312 is a six position unit for receiving true and complement signals from the byte counter latch 219 and the count register 202 (see FIG. 5A).

The true and complement signals from different registers are ANDed together to provide an output to suitable control circuitry. The comparator also receives as an input the three low order bits of the mark B register 302. These inputs are ANDed together with the byte counter latch 219 outputs to provide an output indicating that the byte counter equals the mark B register. This output is also supplied to suitable control circuitry.

During data transfer, the comparator 312 compares the outputs of the count register 206 and the byte couner 216 (see FIG. 5A) to determine the termination of data transfer.

The bus in receiver and latch circuit 316 is an eight position unit with an additional position for parity indication. Each position is a conventional latch circuit. Each position is connected to a particular line of the I/O bus in 176. Outputs are supplied to preselected lines of the B register. Other outputs are supplied to preselected bit positions of the unit address register 210 (see FIG. 5A). Additionally, outputs are supplied to the channel status circuit 320. The unit 316 is operated by suitable gating signals supplied by control circuits. The unit receives the data transmitted on the data bus in and transmit the data to the appropriate unit as part of the I/O interface operation described in the above identified parent application.

The bus out receiver and latch circuit 318 is arranged in a configuration substantially the same as that described for the unit 316. The unit has eight positions plus an additional position for parity. Each position is a conventional latch circuit. Preselected positions of the B register 310 are connected to selected unit positions 318. Additionally, the operation register 212 and the unit address register 210 are connected to selected unit positions 318. Outputs are supplied to the I/O bus out 170.

The address compare register 322 is an eight position register and includes an additional position for parity check. Each position is a conventional AND/OR/INVERT circuit. Each position is connected to the I/O bus out 170 and to the input circuitry for the unit address register 210 (see FIG. 5A). An output signal is supplied to suitable control circuitry (not shown) in connection with the initial setup of the channel when responding to an instruction.

As part of the channel setup procedure, the address in from the I/O device and the address out to the I/O device must be compared. The compare register 322 fulfills this purpose in the channel.

The channel status circuits 320 comprise a plurality of latch circuits responsive to various inputs for indicating the various conditions of the channel status word CSW. Among the various channel status circuits are a wrong length record, a command address update, a program check, a memory protection, a data channel check, a channel control check, and a chaining check. Each latch circuit receives various flag, trigger, control, and gating signals to develop the desired status signal. The output from the various latch circuits are supplied to the channel status bus 218 for transmission to a storage unit over the storage bus in 150. Outputs (not shown) are supplied to other control circuits as will appear hereinafter.

The channel status and the device status are sent to storage as part of the CSW. The device status is provided on the bus in line 176 and gated to storage. The details of generating the device status are described in a copending application, Ser. No. 357,370, previously mentioned.

BYTE COUNTER

The byte counter 216 (FIG. 5A) is a binary octal counter (zero through seven) with an odd parity bit for self-checking purposes. Each counter position is composed of 3 stages—register, latch, and step. The latch and step positions are the look-ahead features which eliminate ripple time associated with binary-trigger counters, so that when the change counter line is activated the register positions (P, 3, 2, 1) are immediately set to the value that had been sitting in the look-ahead feature. The look-ahead feature is always sitting at a number one higher than that which is in the register positions. Once the register has changed there is no delay required to decode its outputs as the look-ahead feature is latched up while the counter is changing and then the look-ahead circuitry advances immediately to the next one ahead count as soon as the change line drops. The register positions can be set to any initial value (000 through 111). The counter will advance from its initial setting to zero and continue advancing (0 through 7) until set to a new value. Since eight bytes are associated with each full word transferred to the channel by an I/O control unit or from the channel to the I/O control unit, this counter controls the gating of information to and from the I/O interface of the channel.

In summary, the byte counter settings are supplied to the data B register 310 (see FIG. 5B) and the mark B register 302 (see FIG. 5B) to set the gates into which data will be loaded. The outputs from the byte counter register 215 (see FIG. 5B) are supplied to a byte counter decoder 217 (see FIG. 5B) which set the correct gate to permit data to be supplied to the register. The mark B register operates the storage address drivers to direct the stored information in the B register and A register to the proper storage positions.

BYTE ADDRESSING A WORD SIZE STORAGE

Figure 6A:
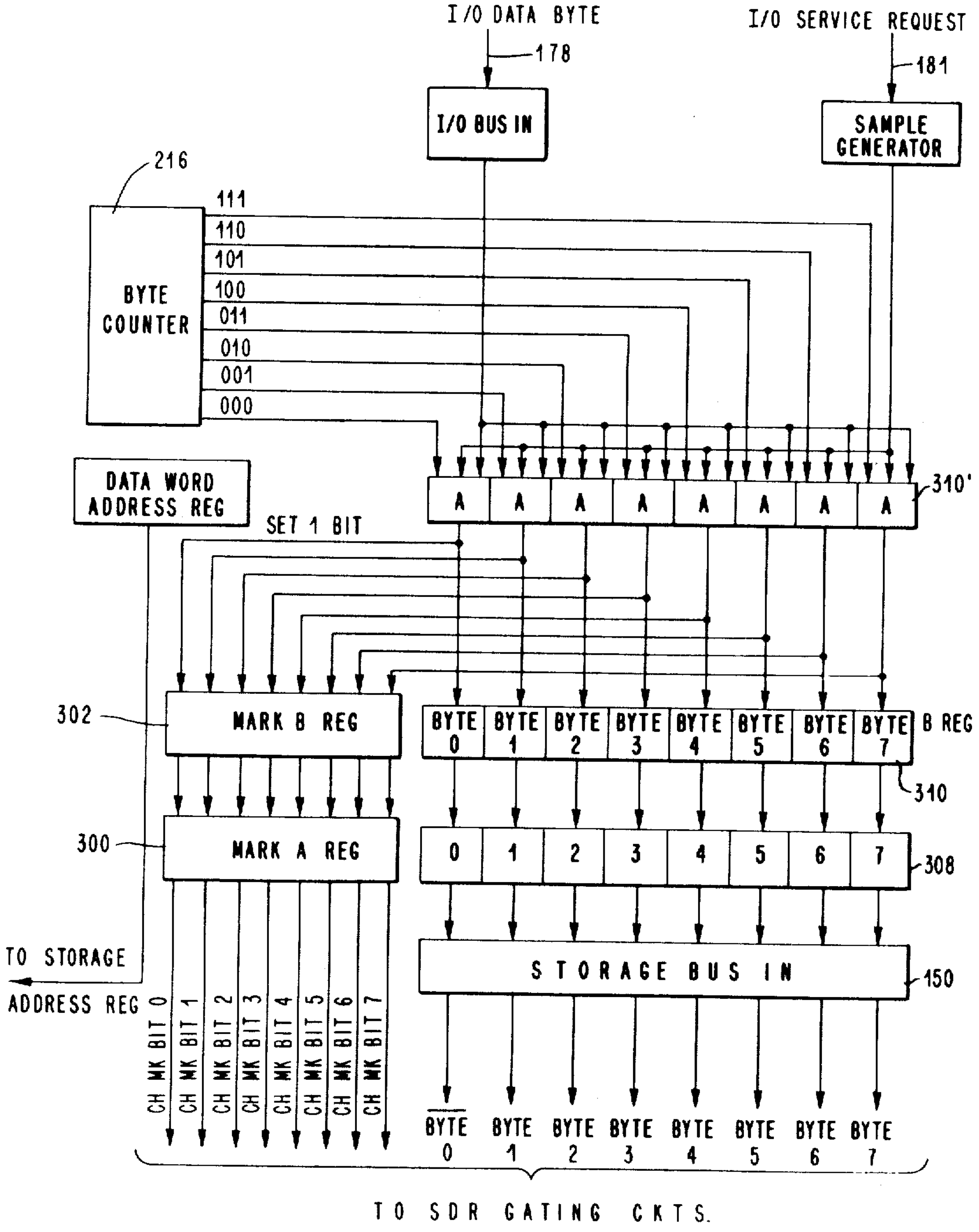
FIGS. 6A and 6B are an electrical schematic of channel registers for variable boundary selection.

The channel in conjunction with the main stoage unit provides for the storing of full or partial 64 bit double words beginning at any byte location in storage by using a mask type operation. The mask or mark bits in conjunction with the storage data word address effectively become a byte address. Control of this byte store operation can best be described by considering FIG. 6A. The channel read operation initially sets the starting word address in the data address register 200 (see FIG. 5A). The byte portion of the starting data address is supplied to the byte counter 216. A read command issued to the I/O unit causes a byte of data to be placed on the I/O bus in 178 which brings up the service request line 181. A sample pulse is supplied to a gate 310′ at the entrance of B register 310. When the gate is opened, the character is gated into the proper byte position of the B register.

At the same time, the corresponding bit in the mask or mark B register 302 is set to a one. This operation will continue to load bytes into the B register and set the corresponding bit in the mark B register until the rightmost byte of the B register is loaded or until the read operation is complete. At this time the contents of the data B register 310 are transferred to the data A register 308. The contents of mark B register 302 are transferred to the mark A register 300 and storage cycle is initiated. When the storage replies, the address in address register, mark A register and the data in the A register are gated to storage.

Figure 6B:
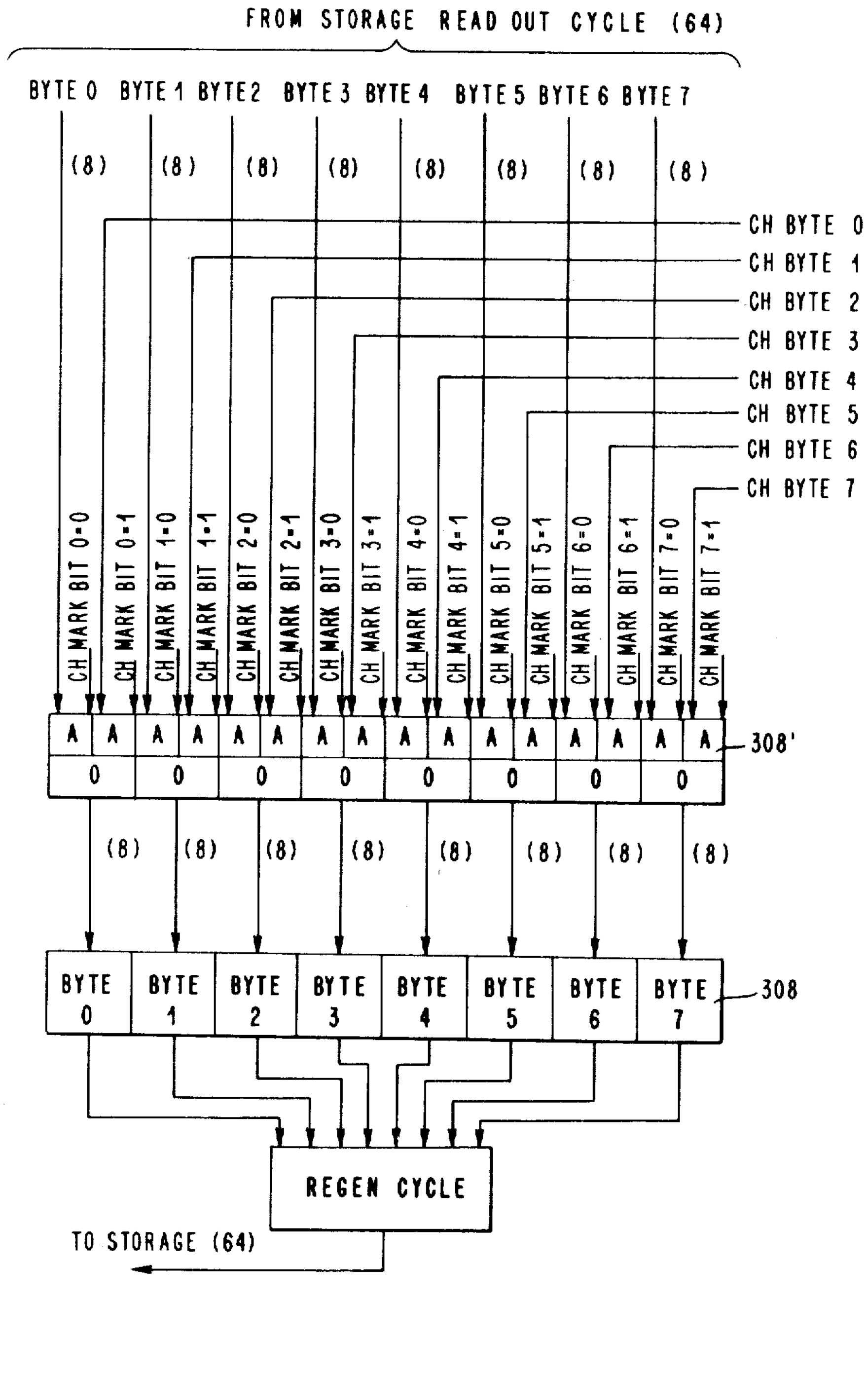

Turning to FIG. 6B, a description of a write storage cycle operation will be described. The word specified by the data word address is read out of storage. The information, sent from the mark A register, is used to condition the gating circuits 308′ at the input of a A register 308. Wherever the channel mark bit is zero, that particular byte from the storage array is gated into the register 308. Wherever the channel mark bit is one, that particular byte from the array is blocked and the corresponding byte in the channel is gated into the A register 308. When a regeneration cycle is initiated, the contents of register A are transferred to register B 310 (see FIG. 6A) and the register 308 readied for the next word.

This system of byte addressing a word size storage can be applied to any byte size word relationship to store any byte or combination of bytes in a word.

BOUNDARY SELECTION VIA PARALLEL WORD GATED ASSEMBLY

I/O device which transmit data are often incapable of waiting for a channel to decide where to fix the starting boundary address of a first data byte to be associated with a chained channel command Word, CCW. Ideally, prefetching a new CCW when the channel detects a running out of the previous word count can offset this limitation. Another alternative is for the channel to anticipate either one of two starting boundary addresses and assemble the incoming data accordingly. One could use shift cells or other devious means to correct this handicap. The present channel, however, has been designed to parallel gate into an assembly register with minimal hardware costs and thereby anticipate either of two starting address boundaries.

Figure 7:
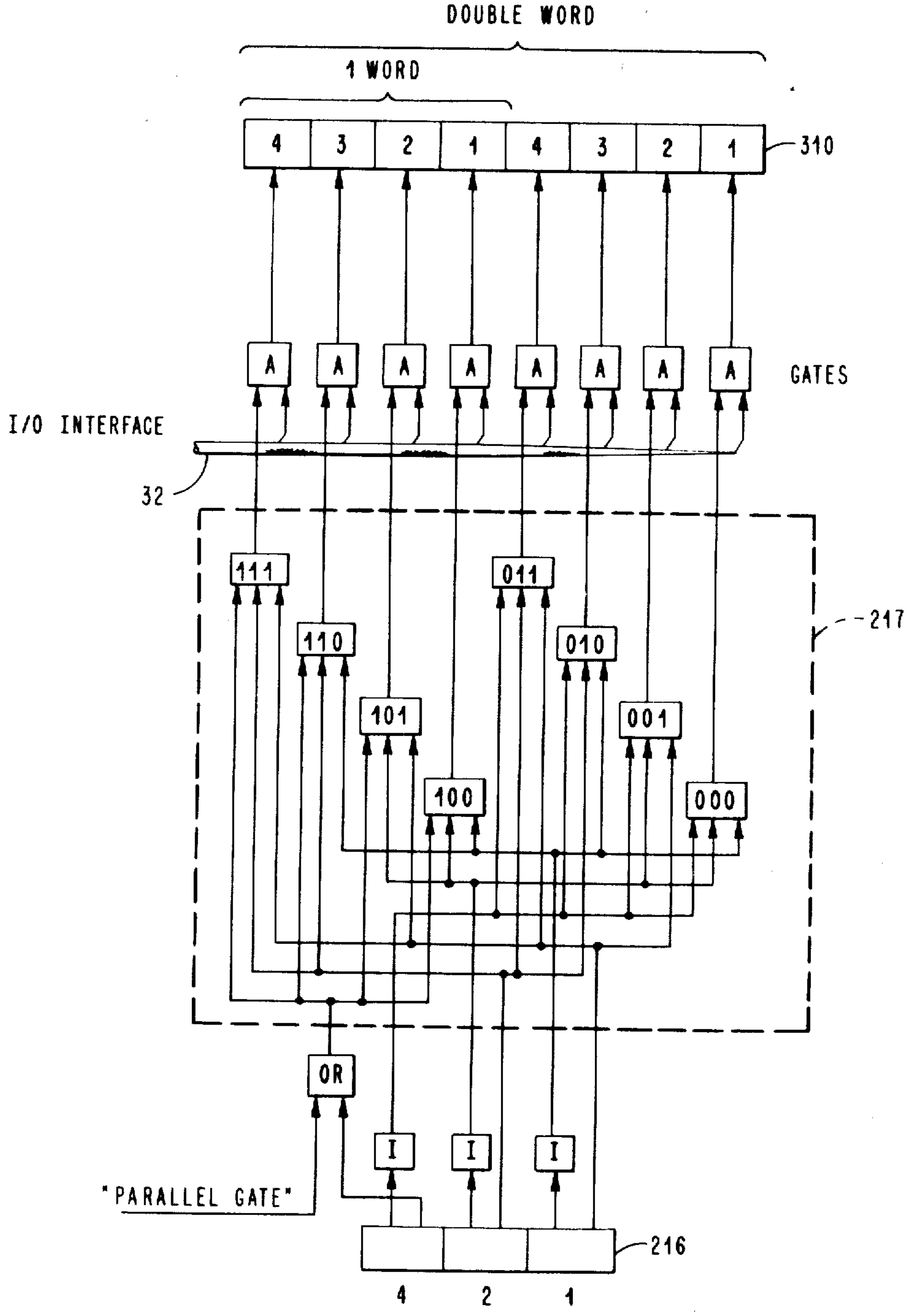
FIG. 7 is an electrical schematic of channel registers for double word and single word loading.

Turning to FIG. 7, a byte of data coming across the I/O interface 32 is gated into its own designated position by the byte counter decoder 217. Additionally, by energizing "parallel gate," the byte is also gated into a subsequent word position. Thus, a first byte of data will be gated into position one of a single word and position one of a double word. This occurs whenever a read data address chaining operation is specified. Normally the channel will generate a new command by the time a four byte count has been reached. When a new command is in the channel, a selection of either a single word or a double word can be made. If the new data address is on a double word boundary, then the second half of the assembly register will be reset of the duplicate word and the assembly of the entire double word will continue. If the new address is on a single word boundary, then the first half of the assembly register will be reset of its duplicate data and the contents of the second half of the register will be stored. This feature permits the present channel to execute data address chaining without relinquishing high speed data transmission rates. This feature also eliminates the necessity of the channel executing a chaining function on either a full byte or eight byte addressing boundaries.

ADDER, COUNT REGISTER AND DATA REGISTER OPERATION

Referring to FIGS. 5A and B, the adder 214 increments the data address register 200 by eight and decrements the count register 206 by eight. For a typical operation, assume that the CPU has commanded that 13 (binary 01101) bytes of data are to be transferred from storage to an I/O device starting at the sixth byte (binary 101) of a data address 30 (binary 11100) and ending at a second byte (binary 001) of data address 32 (binary 11110).

After the channel decodes the operation, and while the I/O device is being selected and readied, the data address register 200 is presently 30 (binary 11100). The data address is gated to storage and the first word to be transferred is placed into the data A register 308. This word is immediately transferred to the data B register 310 and the next word at data address 31 (binary 11101) will be loaded into the A register 308 as soon as the data address register 200 is updated.

As soon as the data address in register 200 is sent to the storage unit, it is also gated to the adder 214 but not including the byte portion. An increment signal is supplied to the adder to change the data address 30 (binary 11100) to data address 31 (binary 11101). The new data address 31 is returned to the data register 200. The next storage fetching operation begins for data address 31. While the word located at address 31 is being transferred to the data A register 308, the low order three bits of the data address or byte address (binary 10101) is gated into the adder with the count. At this time the count is 13 (binary 01101). The sum of the byte address and the count register is 18 (binary 10010). The sum is gated back into the count register. At the same time the byte address 101 is gated into the adder, it is also gated into the byte counter 216. The byte counter steps to the next or sixth byte position to condition the B register while receiving the data from the A register, assuming, of course, that this is a write operation. When the byte counter steps to position 000, a word boundary is encountered and the next data address must be obtained after the count register is decremented by eight bytes. After the A register is loaded with the next word and the address in the data address register is updated, the counter is decremented. The decrementing is done through the adder. A decrement signal is provided to the adder. The decrement signal subtracts eight from the count which now becomes 10 (binary 01010). The new count is sent back to the counter register to replace the former count of 18 (binary 10010). After the next word transfer, the count register is again decremented after the A register is loaded and the data address updated. The count now becomes 2 (binary 00010). The new count is supplied to the count register which generates a signal to turn on a last word trigger. At this point the low order three bits of the count register, i.e., binary 010, are gated into the byte counter-count comparator 312. The byte counter 216 also supplies an input to the comparator 312. This input is from the byte counter latch 219 which is one higher than the byte counter register 215. When the byte counter latch steps to binary 010, the comparator 312 will indicate a correspondence with the count register input. At this point, the comparator generates a signal that initiates an end of sequence operation.

Thus the adder is only required to update the count and change the data address registers after every word transfer. This permits the adder to operate at a slower rate than the data transfer occurring to the A and B registers. Also the adder includes a conventional parity checking circuit which inspects the count, data address, command address for parity error. The counter 216 also includes a parity checking circuit so that throughout the various arithmetic operations, a parity examination is being continually conducted. This feature improves the accuracy and reliability of the channel.

While the invention has been particularly shown and described with reference to the preferred embodiment thereof, it will be understood by those skilled in the art that foregoing and other changes in form and details may be made therein without departing from the spirit and scope of the invention.

What is claimed is:

1. In channel apparatus, for communicating data words between a block of locations in a memory which stores words and input-output devices which handle word portions, where two registers define a memory block; assembly/distribution means for performing conversions between words and word portions, including:

a buffer register, connected to said input-output devices, having a number of sections equal to the number of portions in a word, for holding word portions communicated to and from input-output devices;

a counter, connected to said input/output devices and to said buffer register, having a number of count outputs equal to the number of portions in a word, each combination of count outputs being representative of one set of count conditions assumable by said counter;

stepping means, connected to said counter, for changing the count conditions of said counter for each word portion communicated between an input-output device and said buffer register; and, gating means, connected to said buffer register and counter, for communicating a word portion between an input/output device and the buffer register section corresponding to each current combination of counter outputs.

2. The assembly/distribution means of claim 1, further including:

a second register, connected to said buffer register and to said memory, having a number of sections equal to the number of portions in a word, for holding word portions communicated to and from input-output devices;

transfer means, connected to said buffer register, said second register, said memory and to said input/output devices for permitting the transfer of a data word between one of aforesaid registers and memory during communication of word portions between the other one of aforesaid registers and input/output devices.

3. The assembly/distribution means of claim 1, further including: detection means, connected to said counter outputs, operable to detect a set of count conditions equivalent to the end of a data word.

4. The assembly/distribution means of claim 1, further including means for reducing counter stepping delay, comprising:

storage means, connected to said counter outputs, for storing and making available the combination of counter outputs one higher than that which results from a prior stepping operation; and sensing means, connected to said storage means and to said stepping means, for making the contents of said storage means available in place of said counter outputs when said stepping means are operated.

5. The assembly/distribution means of claim 1, further including means for permitting bi-directional counting, comprising:

complement means, connected to said counter outputs, for indicating the complement value of the binary value of the combination of counter outputs; and reversing means, connected to said complement means, for making said complement value available in place of said counter outputs when stepping in a different direction is desired.

6. In channel apparatus for communicating data words between a block of locations in a memory which stores words and input-output devices which handle word portions, wherein multiple parallel words are transferred between a buffer register in the channel having a multiple word capacity and locations in the memory under control of a current channel command word (CCW) which specifies the memory location and a count designating the number of word portions to be consecutively transferred, beginning at that location, and wherein a new CCW is automatically fetched to define a new memory location and word portion count when data designated by the current CCW have been transferred, means for providing continued assembly of word portions in said channel during the time the new CCW is being fetched comprising:

means for indicating word portion positions in a word and for gating word portions received from said device into respective word portion positions of said buffer register, means for controlling said indicating and gating means so that word portions are parallel gated into corresponding word portion positions of each word of the multiple words of said buffer register, to thereby store duplicate words in parallel in said buffer, and means for energizing said controlling means upon the completion of an operation specified by a current CCW.

7. The combination according to claim 6 including means in said channel for decoding the memory address specified by said new CCW, and means responsive to said decoding means for selecting one word of said duplicate words stored in parallel in said buffer, for transfer to said memory.

8. In channel apparatus for communicating data words between a block of locations in a memory which stores words and input-output devices which handle bytes, wherein multiple parallel words are transferred between a buffer register in the channel having a multiple word capacity and locations in the memory under control of a current channel command word (CCW) which specifies the memory location and a count designating the number of bytes to be consecutively transferred, beginning at that location, and wherein a new CCW is automatically fetched to define a new memory location and byte count when data designated by the current CCW have been tarnsferred, means for providing continued assembly of bytes in said channel during the time the new CCW is being fetched comprising:

a byte counter for counting bytes and for providing outputs corresponding to byte positions of said words, means responsive to said byte counter for gating bytes received from said device into respective byte positions of said buffer register, means for controlling said gating means so that bytes are parallel gated into corresponding byte positions of each word of the multiple words of said buffer register, to thereby store duplicate words in parallel in said buffer, and means for energizing said controlling means upon the completion of an operation specified by a current CCW.

9. The combination according to claim 8 including means in said channel for decoding the memory address specified by said new CCW, and means responsive to said decoding means for selecting one word of said duplicate words stored in parallel in said buffer, for transfer to said memory.

References Cited

UNITED STATES PATENTS

| | | | |
|---|---|---|---|
| 3,061,192 | 10/1962 | Terzian | 235—157 |
| 3,200,380 | 8/1965 | MacDonald et al. | 340—172.5 |
| 3,222,649 | 12/1965 | King et al. | 340—172.5 |
| 3,248,701 | 4/1966 | Eisenstein et al. | 340—172.5 |
| 3,377,619 | 4/1968 | Marsh et al. | 340—172.5 |

PAUL J. HENON, Primary Examiner

R. F. CHAPURAN, Assistant Examiner